2,806,854

BIS(ACYLTHIOIMIDAZOLINYL)ETHYL ETHERS

Richard S. Cook, Rockledge, and W E Craig, Philadelphia, Pa., assignors to Rohm & Haas Company, Philadelphia, Pa., a corporation of Delaware No Drawing. Application June 6, 1956,
Serial No. 589,601

6 Claims. (Cl. 260—309.6)

This invention concerns bis-β-S-(2-thio-N-acylimidazolinyl)ethyl ethers in which the acyl group contains two to three carbon atoms and to a method for their preparation.

The compounds of this invention have the formula

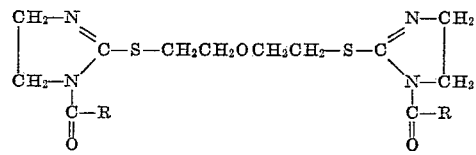

where R is an alkyl group of not over two carbon atoms.

According to this method imidazolidinethione is reacted with β,β'-dichloroethyl ether to form the dihydrochloride of bis-β-S-(2-thioimidazolinyl ethyl ether, which is reacted with an acylating agent supplying acyl groups of two to three carbon atoms, such as acetic or propionic anhydride, and neutralized, or which is neutralized to give the free base which is then reacted with the acylating agent. In place of the anhydride there may be used acetyl or propionyl chloride or bromide, particularly in the presence of an acceptor for a hydrogen halide such as pyridine, triethanolamine, sodium carbonate, or potassium hydroxide. Mixtures of anhydride and acyl halide may also be used.

The reaction of imidazolidinethione and β,β'-dichloroethyl ether is conducted between 60° and about 125° C. About two moles of imidazolidinethione are used per mole of the ether. The reaction is conveniently effected in a solvent, such as a lower alkanol, with the reaction mixture being heated under reflux.

The resulting dihydrochloride of bis-β-S-(2-thioimidazolinyl)ethyl ether is reacted with an acylating agent by heating a mixture of these materials at 75° to 175° C. until reaction appears complete, as by cessation of reaction or clearing of the reaction mixture.

The acylated product is isolated. This is conveniently done by neutralizing the reaction mixture, advisedly with cooling to prevent hydrolysis, as by use of aqueous alkali metal hydroxide solution. The product separates as a white solid, which may be used as obtained or which may be further purified, if desired.

Details of a practical method are given in the following examples which are given by way of illustration and not by way of limitation. Parts therein are by weight.

Example 1

(a) There are mixed 1575 parts of ethylene thiourea, 1105 parts of β,β'-dichloroethyl ether, and 3860 parts of ethyl alcohol. The mixture is heated to reflux with agitation for a period of about 30 hours. The reaction mixture is cooled to room temperature, whereupon a small amount of unreacted ethylene thiourea precipitates and is removed by filtration. The clear brown filtrate is heated under reduced pressure until about one-fourth of the ethyl alcohol is removed. Addition thereto is made of 1000 parts of acetone and the mixture is cooled. A white solid precipitates. It is filtered off, rinsed with acetone, and dried in air to give 1875 parts of a product, which corresponds by analysis to the dihydrochloride of bis-β-S-(2-thioimidazolinyl)ethyl ether. This product has a melting point of 169°–170° C. It contains by analysis 15.9% of nitrogen, 18.4% of sulfur, and 19.9% of chlorine. Corresponding theoretical values are 16.1%, 18.5%, and 20.5% respectively.

(b) There are mixed 350 parts of this product and 750 parts of acetic anhydride. The mixture is heated with stirring to about 85° C. until a homogeneous mixture results. The mixture is then heated under reflux for two hours, during which time a small amount of solid appears. The reaction mixture is poured onto crushed ice and the resulting mixture neutralized by adding an aqueous 50% sodium hydroxide solution, the mixture being kept cool with external cooling. A solid forms. It is filtered off, washed with water, and dried in air. There is obtained 303 parts of a white solid which corresponds by analysis to bis-β-S-(2-thio-N-acetylimidazolinyl)ethyl ether. The analytical data show nitrogen 15.1% and sulfur 17.6%. Corresponding theoretical values are 15.5% and 17.6% respectively. This compound melts at 147°–148° C.

Example 2

The dihydrochloride of bis-β-S-(2-thioimidazolinyl)-ethyl ether is prepared as in Example 1–a.

A portion of 347 parts is dissolved in 200 parts of water. The solution is neutralized with dilute aqueous sodium hydroxide solution with external cooling. A tan-to white solid precipitates, which is filtered off and, to make sure of identity and purity, is recrystallized from benzene. (This need not be done in the preparation of technical grade products.) The recrystallized material amounts to 240 parts (an 88.6% yield). It melts at 108°–110° C. and contains by analysis 20.1% of nitrogen and 21.5% of sulfur. This product is bis-β-S-(2-thioimidazolinyl)-ethyl ether.

To this product there is added propionic anhydride in an amount of 770 parts. The mixture is heated and stirred at 90°–95° C. and heated for an hour at about 150° C. to ensure complete reaction. The reaction mixture is then cooled and poured onto crushed ice. The solid which separates is filtered off, washed, and dried. It is identified as bis-β-S-(2-thio-N-propionylimidazolinyl)ethyl ether. It contains by analysis 49.9% of carbon, 6.9% of hydrogen, 14.6% of nitrogen, and 16.7% of sulfur. Corresponding theoretical values are 49.3%, 6.8%, 14.5%, and 16.6% respectively. It melts at 172°–173° C.

Another preparation of this compound wherein neutralization is performed after reaction with propionic anhydride, as in Example 1–b, leads to the identical product of similar purity.

The compounds of this invention have been examined with respect to their action against insects and it has been found that they possess insecticidal action as a stomach poison. For example, a dust was prepared by dispersing one-half part of bis-β-S-(2-thio-N-acetylimidazolinyl) ethyl ether in 90 parts of finely particled kaolin, seven parts of fuller's earth, and 2.5 parts of condensed naphthalene-formaldehyde sodium sulfonate. This dust was applied to plants infested with army worm with a kill of 100% within 48 hours.

In another set of tests a wettable powder was prepared by mixing 25 parts of bis-β-S-(2-thio-N-propionylimidazolinyl)ethyl ether in 70 parts of clay with two parts of a lignin sulfonate dispersant and three parts of a mixture of a water-soluble octylphenoxypolyethoxyethanol on magnesium carbonate in a proportion to ensure that the mixture thereof was not sticky or wet from the wetting agent. This wettable powder was diluted at the rate of one pound of compound per 100 gallons of water. The mixture was applied as a spray to plants infested with army worm. After 24 hours the kill was 77%. In another series of tests at two pounds per 100 gallons the kill was 100%.

The compound was thus demonstrated to have considerable toxicity for chewing insects when applied in dusts or sprays. But the most interesting property of this compound was found to be its systemic action. It was found that the compounds of this invention are remarkable in that if they are applied to soil in which plants are grown, the plants become highly resistant to chewing insects.

In a series of tests there were mixed sterile soil and a compound of this invention at 222 p. p. m. Bean seeds were placed in the thus treated soil, which was watered daily. The seeds sprouted and plants developed. After 13 days army worms were placed on some test plants and bean beetle larvae on others. Other plants and plants in untreated soil were retained as controls. Counts were made after three days. With bis-β-S-(2-thio-N-acetylimidazolinyl)ethyl ether the kill of army worms was 76% and with bis-β-S-(2-thio-N-propionylimidazolinyl) ethyl ether the kill was 73%. The kills of bean beet larvae were 45% and 30% respectively.

The test was repeated with bis-β-S-(2-thio-N-acetylimidazolinyl)ethyl ether at 111 p. p. m., 27.8 p. p. m., and 13.9 p. p. m. Kills were 83%, 33%, and 27% respectively, the systemic action thus extending over a considerable range of dilutions.

Another series of tests was made with bis-β-S-(2-thio-N-acetyl)ethyl ether applied to soil from a spray providing 111 p. p. m. and army worms were placed on the plants at different intervals of time, kills then being noted within 24 hours. Kills for plants infested on the same day as the spray was supplied were 3%, for plants, the soil about which was treated two days before infesting, 30%, treated four days 87%, treated six days 87%, and treated thirteen days 97%. From these tests it appears that at least four days are required for the plant leaves to acquire sufficient toxicant from the agent applied to the soil about the plants to be systemically toxic to chewing insects. An advantage of this mode of application is evident from the reduced feeding of the insects placed on the thus treated plants, compared to controls of untreated plants.

One way of applying the compounds of this invention is in fertilizers. Thus, two pounds of a compound is extended with a finely divided inert extender, such as a clay, in an amount of three pounds, and this mixture is thoroughly combined with 95 pounds of a fertilizer. This mixture may be spread at such a rate as two or four pounds of compound per acre. A dust or a treated fertilizer may be drilled or applied to soil in connection with planting, as the whole area need not be treated.

We claim:

1. A compound of the formula

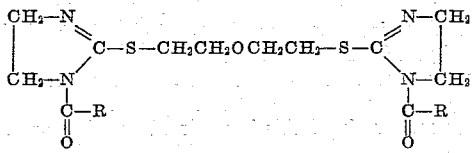

where R is an alkyl group of not over two carbon atoms.

2. The compound bis - β-S-(2-thio-N-acetylimidazolinyl)ethyl ether.

3. The compound bis-β-S-(2-thio-N-propionylimidazolinyl)ethyl ether.

4. A process for preparing bis-β-S-(2-thio-N-acylimidazolinyl)ethyl ethers in which the acyl group contains two to three carbon atoms which comprises reacting imidazolidinethione and β,β'-dichloroethyl ether between 60° and 125° C., whereby a bis-β-S-(2-thioimidazolinyl)ethyl ether is formed, and reacting at about 75° to 175° C. said ether with an acylating agent supplying an acyl group of two to three carbon atoms.

5. The process of claim 4 wherein the acylating agent is acetic anhydride.

6. The process of claim 4 wherein the acylating agent is propionic anhydride.

No references cited.